United States Patent
Stuntebeck et al.

(10) Patent No.: US 11,122,423 B2
(45) Date of Patent: Sep. 14, 2021

(54) PROXIMITY BASED AUTHENTICATION OF A USER THROUGH A VOICE ASSISTANT DEVICE

(71) Applicant: VMware, Inc., Palo Alto, CA (US)

(72) Inventors: Erich Peter Stuntebeck, Johns Creek, GA (US); Kar Fai Tse, Peachtree Corners, GA (US); Ravish Chawla, Chamblee, GA (US); Chaoting Xuan, Duluth, GA (US)

(73) Assignee: VMware, Inc., Palo Alto, CA (US)

( * ) Notice: Subject to any disclaimer, the term of this patent is extended or adjusted under 35 U.S.C. 154(b) by 60 days.

(21) Appl. No.: 16/453,357

(22) Filed: Jun. 26, 2019

(65) Prior Publication Data

US 2020/0413250 A1 Dec. 31, 2020

(51) Int. Cl.
*H04W 12/00* (2021.01)
*G06Q 10/10* (2012.01)
*H04W 12/06* (2021.01)

(52) U.S. Cl.
CPC .. *H04W 12/00503* (2019.01); *G06Q 10/1095* (2013.01); *H04W 12/00514* (2019.01); *H04W 12/0609* (2019.01)

(58) Field of Classification Search
CPC ..... H04W 12/00503; H04W 12/00514; H04W 12/0609; G06Q 10/1095
USPC .......................................................... 455/411
See application file for complete search history.

(56) References Cited

U.S. PATENT DOCUMENTS

| | | | | |
|---|---|---|---|---|
| 2015/0082427 | A1* | 3/2015 | Ivanchykhin | H04W 12/1202 726/22 |
| 2016/0224548 | A1* | 8/2016 | Massand | G06F 16/93 |
| 2016/0373490 | A1* | 12/2016 | Sedar | G06Q 10/109 |
| 2017/0329573 | A1* | 11/2017 | Mixter | H04N 21/4147 |
| 2018/0204187 | A1* | 7/2018 | Stewart | G06Q 10/1095 |
| 2020/0120088 | A1* | 4/2020 | Jain | H04L 65/4015 |
| 2020/0349935 | A1* | 11/2020 | Smith | G10L 15/32 |

* cited by examiner

*Primary Examiner* — Farid Seyedvosoghi
(74) *Attorney, Agent, or Firm* — Thomas | Horstemeyer LLP

(57) ABSTRACT

Disclosed are various approaches for authenticating a user through a voice assistant device and creating an association between the device and a user account. The request is associated with a network or federated service. A user account can be implicitly authenticated based on proximity of a client device to the voice assistant device. An association between the user account and the voice assistant device can then be created.

17 Claims, 5 Drawing Sheets

PROXIMITY BASED AUTHENTICATION OF A USER THROUGH A VOICE ASSISTANT DEVICE

BACKGROUND

In an enterprise setting, individuals can utilize a number of different services and applications that are provided by an enterprise. Some of these services are hosted in a third party environment and some can be hosted on servers operated by the enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity. However, a voice assistant device may not have the capability to easily authenticate the user with his or her service endpoints. In addition, the assistant might be in a shared environment, such as in a hotel room, an office environment, or other environments in which multiple people might have access to the device. Providing access to the user's services to the assistant can create various issues.

First, authentication of the user can be a process can be performed using application programming interfaces (APIs) created by the provider of the assistant ecosystem to link a user's identity with a particular assistant device. However, in a shared environment, the user might not wish to permanently link his or her identity with the assistant device. Additionally, in a shared environment, the user might not have the proper privileges authentication credentials to access and modify the linked accounts on the assistant device. Additionally, a user might simply be hesitant to perform a cumbersome process of linking his or her service accounts to an assistant device and then later unlinking the accounts from the device when use of the assistant device is completed. Additionally, an enterprise might wish to control the authentication process with the assistant device rather than rely upon a provider of the assistant ecosystem to do so.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for associating a user account with a voice assistance device so that a user can data from various services using the voice assistant device. A user might have accounts in various services for which access is authenticated using an identity provider service utilized by the user's enterprise. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. For example, a third party email service or cloud-based sales tool with which the enterprise provides accounts for its users can authenticate users through an identity provider service.

In an environment in which voice assistant devices are becoming more ubiquitous, providing users access to services provided by the enterprise can be beneficial. However, authenticating users to a SSO portal and/or service endpoints can be challenging. Additionally, as voice assistant devices are becoming more common in the enterprise, they are often being deployed in office environments, such as in conference rooms or other environments where the voice assistant device can be shared among multiple users. A voice assistant device may not have the capability to easily authenticate the user with his or her service endpoints. Therefore, examples of this disclosure can provide for proximity based authentication of a user based on the proximity of his or her managed device to the voice assistant device, which can provide the user with the ability to access certain enterprise data through the voice assistant device.

Figure 1:
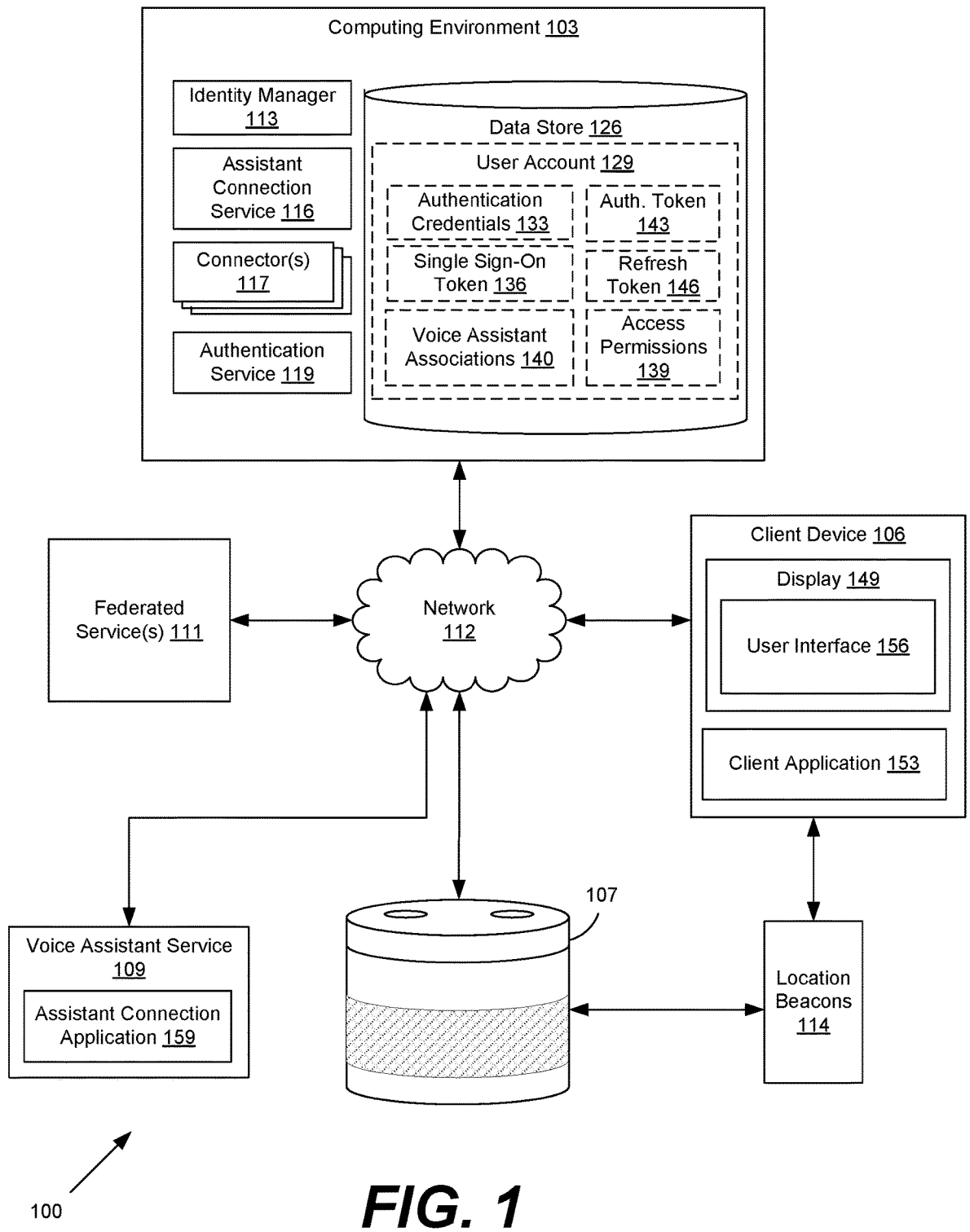
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 107, a voice assistant service 109, and one or more federated services 111, which are in data communication with each other across a network 112. In some embodiments, location beacons 114 can also be deployed and linked to a voice assistant device 107, such as in the same room or physically attached to the voice assistant device 107. Location beacons 114 may or may not have the ability to communicate over the network 112 and, in some instances, might only be equipped with short range communication interfaces, such as Bluetooth.

The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more federated services 111 can also be executed in the computing environment 103 in the case of service endpoints that are provided by the enterprise on the same computing resources of the enterprise. In some embodiments, however, one or more of the federated services 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the federated services 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more federated services 111. Examples of identity managers 113 include VMWARE's Identity Manager or MICROSOFT's Active Directory Federation Services.

The authentication service 119 can retrieve and cache authentication data, such as authentication tokens 143 and refresh tokens 146, provided by various federated services 111. The cached authentication data can be used by the assistant connection service 116 to query the federated services 111 for information.

The assistant connection service 116 can facilitate authentication of users who are using a voice assistant device 107. Additionally, the assistant connection service 116 can enable users to retrieve information from one or more federated services 111 for playback by an voice assistant device 107 that the user can associate with their user account 129 through the assistant connection service 116.

A connector 117 can provide a standardized mechanism for the assistant connection service 116 to communicate with a federated service 111. Each federated service 111 may provide an application programming interface (API) for communicating, querying, or otherwise interacting with the federated service 111, which can include different methods or functions with different parameters compared to other federated services 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the federated service 111. To add support for a new federated service 111, a new connector 117 can be created without needing to modify the assistant connection service 116 itself. Likewise, if a change is made to the API of the federated service 111, the connector 117 between the assistant connection service 116 and the federated service can be updated without having to modify the assistant connection service 116 itself.

A federated service 111 can be web application, web service, or other network facing application that can be accessed using a shared identity manager 113. One or more federated services 111 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more voice assistant devices 107 that are associated with a user account 129 and with which a user has authenticated. Once a voice assistant association 140 is established that links a voice assistant device 107 and user account 129, the assistant connection service 116 can provide data from a federated service 111 for playback by the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various federated services 111 on behalf of the authenticated user. Additionally, the SSO token 136 can be used by the assistant connection service 116 to access various federated services 111 on behalf of the authenticated user and a voice assistant device 107 associated with the user. In some instances, such as those implementing a version of the KERBEROS protocol, a separate SSO token 136 can be generated for each federated service 111 that the client device 106 attempts to access on behalf of the user. In other instances, the single SSO token 136 can be generated and used to provide the client device 106 with access to several of the federated services 111. Although each of the federated services 111 can have a different set of authentication credentials 133 linked to the user account 129, such as a different user name and password combination, the SSO token 136 allows the user to authenticate once with the identity manager 113 in order to use each of the federated services 111 instead of having to authenticate with each of the federated services 111 separately.

The access permissions 139 represent computing resources that the user account is authorized to access. For example, the access permissions 139 can indicate that a user account is permitted to access some federated services 111 but is prohibited from accessing other federated services 111. As another example, the access permissions 139 can indicate that the user account 129 is allowed to access certain features of a federated service 111, but prohibited from accessing other features. For example, if one of the federated services 111 that a user was permitted to access was a customer relationship management (CRM) service, the user might have permission to access his or her own contacts but be prohibited from accessing the sales contacts of other users.

An authentication token 143 is a token provided by one of the federated services 111 in response to a successful authentication with the federated service 111. The authentication token 143 represents that a user account 129 is currently authenticated by the federated service 111 and authorized to access or otherwise interact with the federated service 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the federated service 111. The authentication token 143 can be provided, for example, as part of an authentication exchange using a version of the OAUTH protocol.

A refresh token 146 is a token provided by one of the federated services 111 in response to a successful authentication with the federated service 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

Each federated service 111 can be associated with a federated user account. A user with a user account 129 may also have multiple federated user accounts. For example, a user may have one federated user account for each federated service 111 that the user is registered or enrolled with. As another example, the user may have multiple federated user accounts for a federated service 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails.

Additionally, the client application 153 can represent an application that facilitates user authentication with the authentication service 119 and the assistant connection service 116 so that a user can create an association between a voice assistant device 107 and her user account 129. To this end, the client device 106 can include one or more local area network interfaces, microphones, speakers, or cameras that facilitate communication with a voice assistant device 107. The client device 106 can also include a Bluetooth or other short range communications interface to communicate with a location beacon 114.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107. The voice assistant device 107 can also have a Bluetooth or other network interface that can be utilized to communicate with a location beacon 114.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed in order for extended capabilities to be available to every user.

In the context of this disclosure, the assistant connection application 159 can facilitate authentication of a user with the assistant connection service 116 using the voice assistant device 107. Upon authentication, the assistant connection application 159 can retrieve data from the assistant connection service 116 or federated services 111 and cause at least a portion of the data to be played back through the voice assistant device 107. Accordingly, various commands can be implemented in the assistant connection application 159, such as commands to retrieve or make changes to data in a user's calendar, email, or other federated services.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

The location beacons 114 can represent one or more device that can help detect proximity of a client device 106 to a particular area that is also associated with the voice assistant device 107. A location beacon 114 can represent a Bluetooth beacon a beacon with another networking capability that broadcasts a localized signal that can only be captured by a client device 106 when in proximity to the location beacon 114. The location beacon 114 can be configured to broadcast such a signal into the room in which a voice assistant device 107 is located, for example. The location beacon 114 can transmit a unique or rolling identifier that can be captured by the client application 153 and sent to the assistant connection application 159 or the assistant connection service 116 as proof of proximity to the location beacon 114. In some cases, the location beacon 114 can receive a device identifier or other identifying token from the client device 106 when the client device 106 is in proximity to the location beacon 114. The location beacon 114 can then provide the identifier identifying the client device 106 to the assistant connection application 159 or the assistant connection service 116 as proof of proximity to the location beacon 114.

The location beacon 114 can also represent a near field communication or radio frequency identification tag that is positioned on or near the voice assistant device 107, such as in the same room as the voice assistant device 107. The client device 106 can capture an identifier from the location beacon 114 using a corresponding sensor integrated into the client device 106 and provide the identifier identifying the client device 106 to the assistant connection application 159 or the assistant connection service 116 as proof of proximity to the location beacon 114.

The location beacon 114 can also represent an image target or an augmented reality image target that can be captured by a camera associated with the client device 106. The image target can include a quick response (QR) code that includes an identifier that is uniquely associated with a particular location, such as a room within an office environment. The client device 106 can capture an identifier from the image target using an application that can extract the identifier using a camera associated with the client device 106. The client device 106 can provide the identifier identifying the client device 106 to the assistant connection application 159 or the assistant connection service 116 as proof of proximity to the location beacon 114.

Next, a general description of the operation of the various components of the networked environment 100 is provided. To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

In some embodiments, the authentication service 119 can then authenticate the user with one or more of the federated services 111 in the background or upon the first request for data from a particular federated service 111. For example, the authentication service 119 can send the user's SSO token 136 to each federated service 111 that an access permission 139 indicates a user is authorized to access. In other instances, the authentication service 119 can send the user's SSO token 136 to every federated service 111 that is registered with the identity manager 113. In some embodiments, the SSO token 136 can be included in an authentication request that complies with a version of the OAUTH protocol.

The computing environment 103 can also verify that the user account 129 associated with the SSO token 136 is allowed to access the federated service 111. For example, the authentication service 119 or assistant connection service 116 can query the data store 126 to retrieve a username or other user identifier for the user account 129 associated with the single sign-on token 136. The computing environment 103 can then compare the retrieved username or other user identifier with its own list of registered or authorized users. If the retrieved username or other user identifier matches a username or user identifier stored in the list of registered or authorized users maintained by the federated service 111, then the computing environment 103 can determine that the user account 129 linked to the SSO token 136 is authorized to access the federated service 111. Upon successful authorization, the computing environment 103 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the assistant connection service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the federated service 111. The second authentication request can include the refresh token 146.

In response, the federated service 111 can evaluate the refresh token 146 to determine whether the refresh token 146 is still valid. For example, the federated service 111 could evaluate the refresh token 146 to determine whether it has expired. As another example, the federated service 111 could evaluate the refresh token 146 to determine whether it has been revoked. If the refresh token 146 remains valid, the federated service 111 can then provide the authentication service 119 with a new authentication token 143. By storing authentication tokens 143 in the data store 126, the assistant connection service 116 can utilize the tokens to access data from one or more federated service 111 on behalf of the user.

Accordingly, a user might enter a room in an office environment or attend/organize a meeting within the room. The room might have a voice assistant device 107. The voice assistant device 107 could also be in another type of shared environment, such as a hotel, conference center, or other shared setting. Accordingly, the functionality associated with the assistant connection application 159 can provide a skill or capability that the user can invoke on the voice assistant device 107. The assistant connection application 159 can communicate with the assistant connection service 116 to make a determination as to whether a user account 129 is associated with a particular voice assistant device 107. Additionally, the assistant connection application 159 and assistant connection service 116 can exchange communications that enable the voice assistant device 107 to play back data requested by the user.

The assistant connection application 159 can be invoked by the user through a keyword spoken by the user. For example, the user can speak "Assistant, please open enterprise workspace." The keyword "enterprise workspace," or any other keyword, can be associated with the assistant connection application 159 within the assistant ecosystem. When the user invokes the assistant functionality on the voice assistant device 107 and speaks a particular keyword, the assistant connection application 159 can be launched by voice assistant service 109.

The assistant connection application 159 can be instrumented to obtain data from particular federated services 111 on behalf of a user. For example, if the user requests data from her calendar, email, contacts, or other federated services 111, the assistant connection application 159 can obtain the requested data through the assistant connection service 116. The assistant connection service 116 can authenticate a user account 129 and associated it with the voice assistant device 107 based upon detected proximity of a client device 106 of the user to a location beacon 114 that is linked to the voice assistant device 107. Upon authenticating, the assistant connection service 116 can create a voice assistant association 140 that links together the user account 129 and the voice assistant device 107. As a result, the user can then access data from federated services 111 that are supported by the assistant connection application 159 and the assistant connection service 116. Upon detecting that the client device 106 of the user is no longer in proximity to the location beacon 114, the voice assistant association 140 can be removed from the user account 129. Accordingly, users will then be unable to access data from federated services 111 associated with the user account 129 after removal of the voice assistant association 140.

Figure 2:
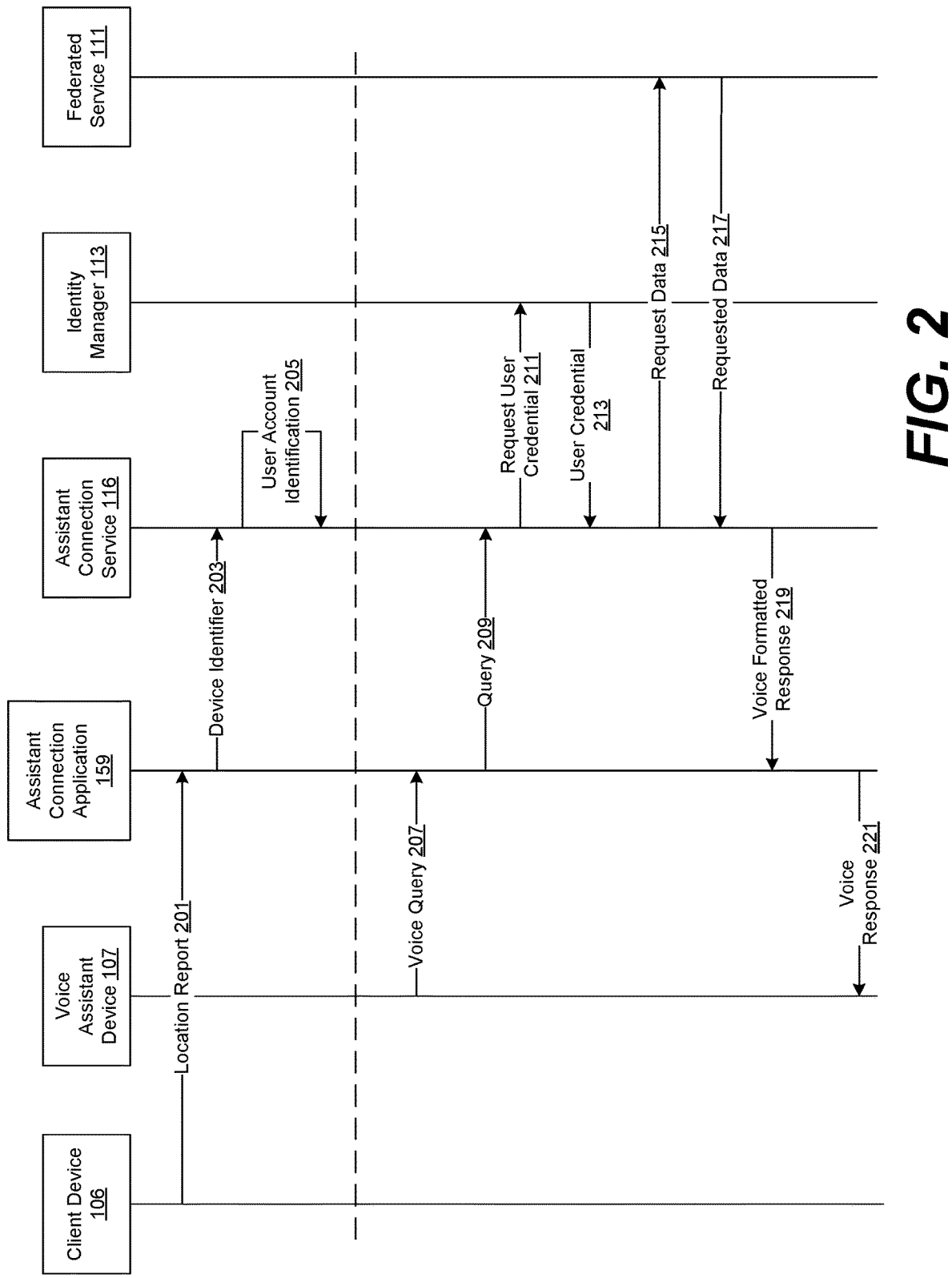
FIG. 2 depicts a sequence diagram according to examples of the disclosure.

Referring next to FIG. 2, shown is a sequence diagram illustrating how an association between a voice assistant device 107 and a user account 129 can be created and then how the user can access data from a federated service 111 associated with the user account 129. In the scenario shown, the assistant connection service 116 can authenticate a user and associate a user account 129 with a voice assistant device 107 based upon a detected proximity of a client device 106 to the voice assistant device 107.

At step 201 of the sequence diagram, the assistant connection application 159 that implements the skill or functionality within the voice assistant device 107 can receive a location report on behalf of a client device 106. The location report can be generated by the client application 153 automatically upon entering into a room or within the vicinity of a location beacon 114. The location beacon 114 can be linked to a particular voice assistant device 107 within the data store 123. In some implementations, the location report can be received directly from the location beacon 114 rather than from the client device 106. The location report can also be generated by the client application 153 when the user taps the client device 106 to a NFC tag or captures a particular image target associated with a particular voice assistant device 107. The location report can identify one or more of the location beacon 114, the client device 106, and the voice assistant device 107 by respective identifiers.

At step 203, the assistant connection application 159 can extract a device identifier associated with the client device 106 from the location report. The device identifier can uniquely identify the client device 106 with respect to other client devices 106 that are associated with user accounts 129. The assistant connection application 159 can forward the identified device identifier to the assistant connection service 116 so that the assistant connection service 116 can create an association between a user account 129 and the voice assistant device 107. The assistant connection application 159 can also identify a voice assistant device 107 associated with the location beacon 114. The assistant connection application 159 can provide the device identifier of the client device 106 and the voice assistant device 107 to the assistant connection service 116. In some embodiments, the assistant connection application 159 can provide an identifier of the location beacon 114 to the assistant connection service 116, and the assistant connection service 116 can identify a particular voice assistant device 107 that is associated with the location beacon 114.

In some instances, the assistant connection application 159 can receive multiple location reports that are associated with multiple client devices 106. For example, multiple users with different client devices 106 might enter a room at the same or similar time. As another example, users with client devices 106 might pass by a room but not enter the room, but their client device 106 might generate a location report that is sent to the assistant connection application 159. Therefore, the assistant connection application 159 can provide multiple device identifiers to the assistant connection service 116 at once or in short succession.

At step 205, the assistant connection service 116 can identify a user account 129 that should be associated with the voice assistant device 107 by creating a voice assistant association 140. By creating such an association, the user account 129 is considered linked to or authenticated with the voice assistant device 107. As noted above, multiple device identifiers corresponding a client devices 106 can be received in association with the same voice assistant device 107 or location beacon 114. Therefore, the assistant connection service 116 can also detect a particular client device 106 that should be associated with the voice assistant device 107.

The assistant connection service 116 can perform a disambiguation process to identify one of the user accounts 129 associated with the client devices 106 from which device identifiers are received. In one scenario, the assistant connection service 116 can identify user accounts 129 associated with the client devices 106 and also examine the calendars associated with the various user accounts 129. If one of the user accounts 129 is associated with a calendar event that also identifies a meeting location that corresponds to the voice assistant device 107, the assistant connection service 116 can identify this user account 129 as the one with which a voice assistant association 140 should be created. If multiple user accounts 129 are associated with a calendar event that also identifies a meeting location that corresponds to the voice assistant device 107, the assistant connection service 116 can identify a user account 129 that is the meeting organizer as the one with which a voice assistant association 140 should be created.

Once a user account 129 is established as implicitly authenticated with the voice authentication device 107 based on proximity of a client device 107 to the voice assistant device 107, the assistant connection service 116 can await a voice query from the voice assistant device 107, which is depicted below the dotted line of FIG. 2.

At step 207, the voice assistant device 107 can transmit a voice query to the assistant connection application 159. The voice assistant device 107 can capture a user's voice and make a determination that the voice query should be forwarded to the assistant connection application 159 based upon a keyword or a context of the voice query.

The user can ask the voice assistant device 107 to launch or invoke the assistant connection application 159 by using a keyword linked to the assistant connection application 159 within an assistant ecosystem in which the voice assistant device 107 operates. The user can request that the voice assistant device 107 retrieve data from the user's calendar, email, task list, or another federated service 111 for which access is authenticated by the identity manager 113. Upon launching the assistant connection application 159, the user can request that the assistant connection application 159 access data from a federated service 111 linked to her enterprise account. The assistant connection application 159 can identify the voice assistant device 107 from which the request is originating and determine whether the voice assistant device 107 is linked to a user account 129 in the data store 126. If the voice assistant device 107 is not linked with a voice assistant association 140 of a particular user account 129, the assistant connection application 159 can cause the voice assistant device 107 to play back a message that tells the user that authentication is required before data can be retrieved from a federated service 111.

Assuming a user account 129 is already associated with the voice assistant device 107, the assistant connection application 159 can forward a transcribed version of the voice query to the assistant connection service 116 at step 209. The assistant connection application 159 can utilize a speech-to-text capability within an assistant ecosystem or application programming interface (API) to obtain a text transcription of some or all of the voice query.

At step 211, the assistant connection service 116 can identify a federated service 111 from which to obtain data associated with the request. The assistant connection service 116 can request a user credential, such as an authentication token 143 that corresponds to the federated service 111, from the identity manager 113. The authentication token 143 can allow the assistant connection service 116 to authenticate on behalf of the user account 129 with a particular federated service 111. At step 213, the identity manager 113 can provide the requested user credential to the assistant connection service 116.

At step 215, the assistant connection service 116 can request the data requested by the user in the query from one or more federated services 111. The federated service 111 can house a user's calendar, task list, email, or other data that the user might wish to access through the voice assistant device 107. The request can include the authentication token 143 obtained at step 213. The request can be made using an API provided by the federated service 111 and can also include multiple requests to multiple federated services 111 for the requested data.

At step 217, the federated service 111 can provide the request data to the assistant connection service 116. Again, the requested data can correspond to data from the user's calendar, task list, email, or other data that the user might wish to access through the voice assistant device 107.

At step 219, the assistant connection service 116 generate and transmit a voice formatted response to the query to the assistant connection application 159. The voice formatted response can be a text response that can be translated to voice by the assistant connection application 159 or the voice assistant device 107. The voice formatted response can also be an audio file or clip that contains the voice response to the query.

At step 221, the assistant connection application 159 transmit the voice response to the voice assistant device 107. The voice response can be a text response that can be translated to voice by the voice assistant device 107. The voice response can also be an audio file or clip that contains the voice response to the query that can be played back by the voice assistant device 107.

Figure 3:
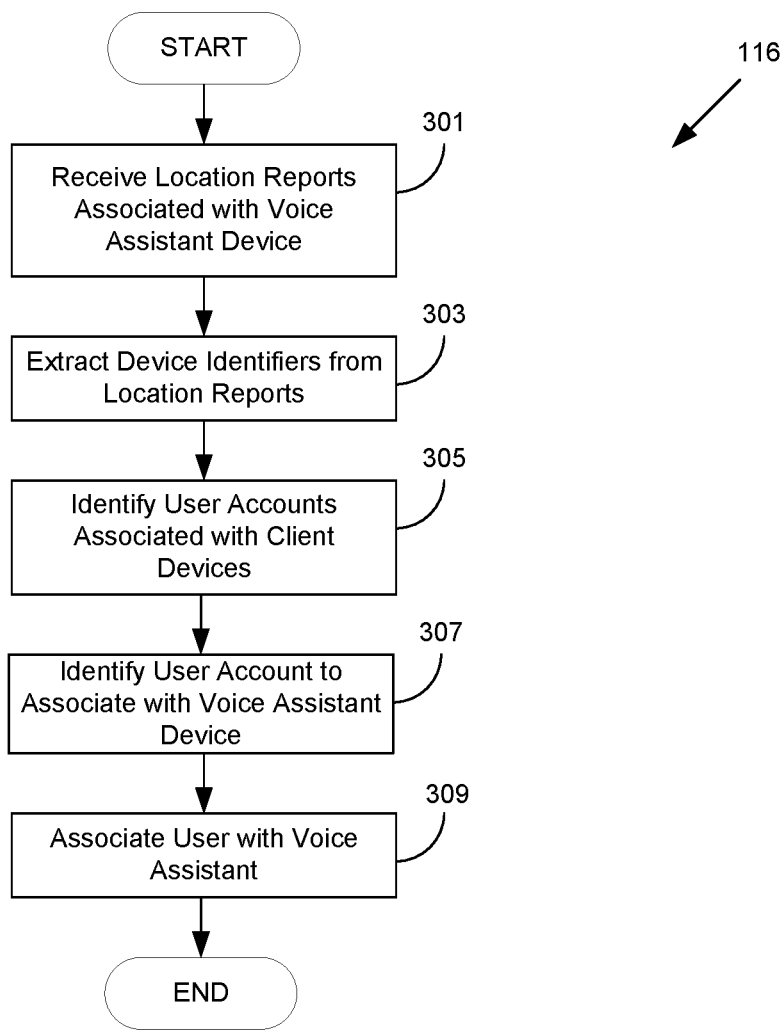
FIG. 3 is a flow chart depicting the operation of an example of the disclosure.

Referring next to FIG. 3, shown is a flowchart depicting an example of the operation of a portion of the assistant connection service 116. It is understood that the flowchart of FIG. 3 provides merely an example of the many different types of functional arrangements that can be employed to implement the portion of the assistant connection service 116 as described herein. As an alternative, the flowchart of FIG. 3 can be viewed as depicting an example of elements of a method implemented by the assistant connection service 116 in some implementations.

FIG. 3 illustrates how the assistant connection service 116 can implicitly authenticate a user account 129 with a voice assistant device 107 based on proximity to a location beacon 114 associated with the voice assistant device 107. Beginning at step 301, the assistant connection service 116 can receive a location report associated with a voice assistant device 107. The location report can identify a client device 106 as well as a location beacon 114 or a location associated with the voice assistant device 107. In some cases, the location report can simply identify or originate from the voice assistant device 107 along with the client device 106. The location report indicates that the At step 303, the assistant connection service 116 can extract device identifiers corresponding to the client device 106, voice assistant device 107 or location beacons 114 that are embedded location report. As noted above, the location report can include a device identifier of the client device 106 and voice assistant device 107 or the client device 106 and location beacon 114. The assistant connection service 116 can identify a combination of the client device 106 and the voice assistant device 107 based on the combination of identifiers received in the location report. Also, the assistant connection service 116 can receive multiple location reports corresponding to multiple client devices 106 and later perform a disambiguation process to identify a particular user account 129 to implicitly authenticate.

At step 305, the assistant connection service 116 can identify user accounts 129 associated with the client devices 106 for which the location reports are received. For example, multiple users with different client devices 106 might enter a room at the same or similar time. As another example, users with client devices 106 might pass by a room but not enter the room, but their client device 106 might generate a location report that is sent to the assistant connection service 116.

At step 307, the assistant connection service 116 can identify a user account 129 to implicitly authenticate. Once authenticated, the assistant connection service 116 can create a voice assistant association 140 within the user account 129 that associates the voice assistant device 107 with the user account. The assistant connection service 116 can perform a disambiguation process to identify one of the user accounts 129 associated with the client devices 106 from which device identifiers are received. In one scenario, the assistant connection service 116 can identify user accounts 129 associated with the client devices 106 and also examine the calendars associated with the various user accounts 129. If one of the user accounts 129 is associated with a calendar event that also identifies a meeting location that corresponds to the voice assistant device 107, the assistant connection service 116 can identify this user account 129 as the one with which a voice assistant association 140 should be created. If multiple user accounts 129 are associated with a calendar event that also identifies a meeting location that corresponds to the voice assistant device 107, the assistant connection service 116 can identify a user account 129 that is the meeting organizer as the one with which a voice assistant association 140 should be created.

At step 309, once a user account 129 is established as implicitly authenticated with the voice authentication device 107 based on proximity of a client device 106 to the voice assistant device 107, the assistant connection service 116 can create a voice assistant association 140 within the user account 129. Thereafter, the process can proceed to completion.

Figure 4:
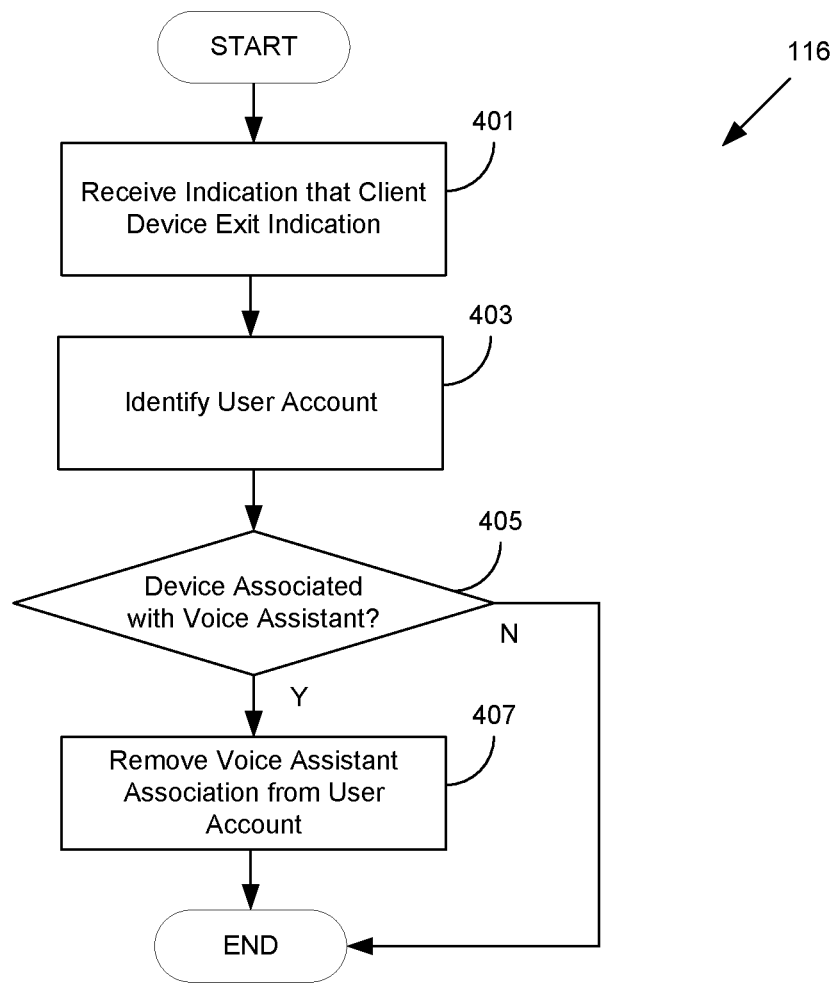
FIG. 4 is a flow chart depicting the operation of an example of the disclosure.

FIG. 4 is another flowchart depicting an example of the operation of a portion of the assistant connection service 116. It is understood that the flowchart of FIG. 4 provides merely an example of the many different types of functional arrangements that can be employed to implement the portion of the assistant connection service 116 as described herein. As an alternative, the flowchart of FIG. 4 can be viewed as depicting an example of elements of a method implemented by the assistant connection service 116 in some implementations.

FIG. 4 illustrates how the assistant connection service 116 can remove a voice assistant association 140 that was created after implicitly authenticating a client device 106, as shown in the process of FIG. 3. Beginning with step 401, the assistant connection service 116 can receive a client device exit indication from the voice assistant device 107, a location beacon 114, or the client device 106 itself. A client device exit indication can be sent when the voice assistant device 107 or location beacon 114 no longer detects the presence of the client device 106 for which a voice assistant association 140 was created. In one embodiment, the client device 106 can send an indication to the assistant connection service 116 when the location beacon 114 is no longer detected. In another embodiment, the location beacon 114 can send an indication to the assistant connection service 116 when the client device 106 is no longer detected. To this end, either the client device 106 or location beacon 114 can periodically poll for the presence of the other.

At step 403, assistant connection service 116 can identify a user account 129 associated with the client device exit indication. At step 405, the assistant connection service 116 can determine whether a voice assistant association 140 linking together the voice assistant device 107 and the user account 129 exists. If not, the process can proceed to completion. If one exists, the process proceeds to step 407, where the assistant connection service 116 can remove or delete the voice assistant association 140. The effect of removing the voice assistant association 140 serves to unauthenticated the user account that was implicitly authenticated.

Figure 5:
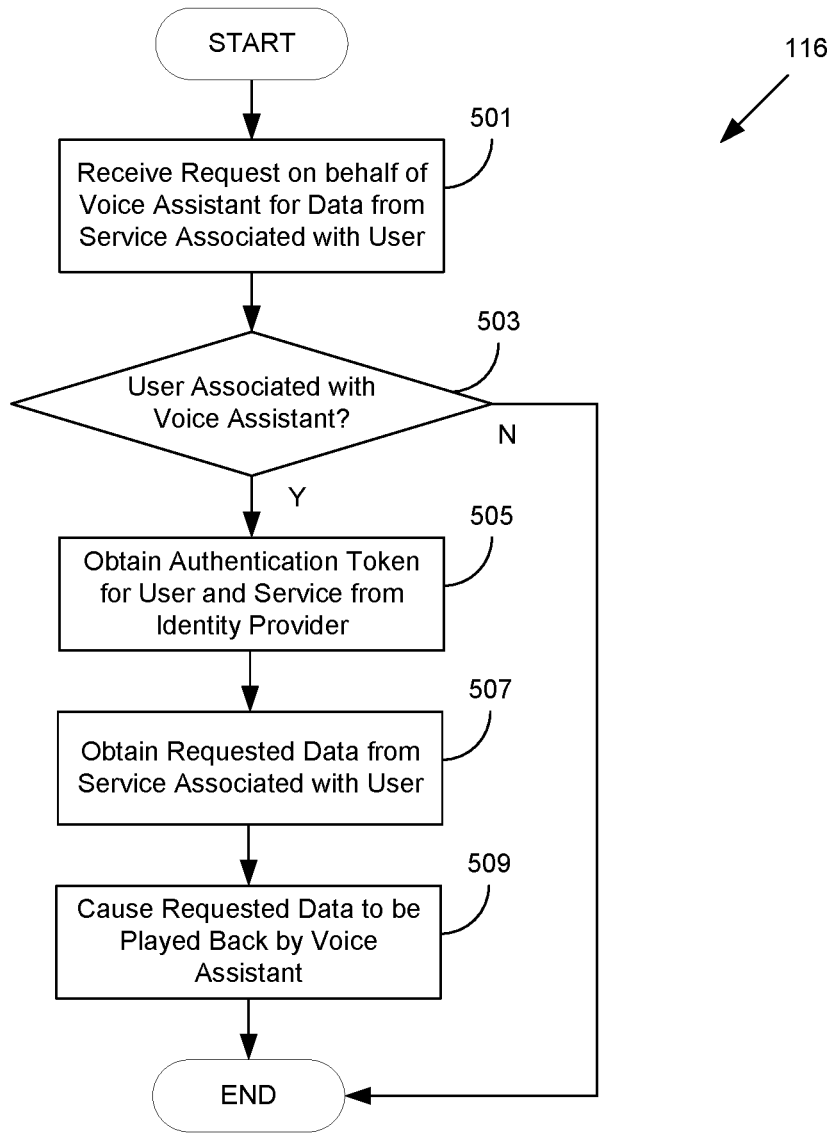
FIG. 5 is a flow chart depicting the operation of an example of the disclosure.

FIG. 5 is another flowchart depicting an example of the operation of a portion of the assistant connection service 116. It is understood that the flowchart of FIG. 5 provides merely an example of the many different types of functional arrangements that can be employed to implement the portion of the assistant connection service 116 as described herein. As an alternative, the flowchart of FIG. 5 can be viewed as depicting an example of elements of a method implemented by the assistant connection service 116 in some implementations.

At step 501, the assistant connection service 116 can receive a request on behalf of a voice assistant device 107 for data from a federated service 111, such as a user's email, calendar, tasks, or other enterprise data. At step 503, the assistant connection service 116 can determine whether a user account 129 is associated with the device identifier embedded in or associated with the request received in step 501. The assistant connection service 116 can make this determination by determining whether a voice assistant association 140 is associated with a user account 129 and that the voice assistant association 140 contains the same device identifier that is contained in the request received at step 501. If no voice assistant association 140 matching the device identifier is received, the process can proceed to completion, as the assistant connection service 116 can determine that the request should not be processed. Otherwise, the process proceeds to step 505.

At step 505, the assistant connection service 116 can obtain a SSO token 136 that corresponds to the federated service 111 from which the data is requested by the user. The SSO token 136 can be obtained from the identity manager 113 or the data store 126. In some implementations, the assistant connection service 116 can also make a determination as to which federated service 111 a request from a voice assistant device 107 pertains to. For example, a mapping or translation from a requested data type to a federated service 111 might be necessary. Accordingly, the assistant connection service 116 can perform a natural language analysis on the request from the voice assistant device 107 to determine a data type that is requested by the user and then determine which federated service 111 associated with the user account 129 contains the requested data.

At step 507, the assistant connection service 116 can obtain the requested data from the federated service 111 associated with the user. The assistant connection service 116 can utilize the SSO token 136 associated with the federated service 111 to authenticate its access to the federated service 111.

At step 509, the assistant connection service 116 can cause the data obtained from the federated service 111 to be played back by the voice assistant device 107. In one example, the assistant connection service 116 can provide a response to the assistant connection application 159 or the voice assistant device 107 that can be translated to speech and played back by the voice assistant device 107. In some scenarios, the assistant connection service 116 can format the response into a sentence or provide data that can be formed into a sentence by APIs provided by the voice assistant service 109.

The flowcharts of FIGS. 3-5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for authenticating a user with a service account through a voice assistant, comprising:
   at least one computing device;
   a user authentication service that, when executed by the at least one computing device, causes the at least one computing device to at least:
   receive an indication that at least one client device is in proximity to a voice assistant device, the indication generated at least in part by capturing an identifier from a Bluetooth location beacon in proximity to the voice assistant device;
   extract at least one device identifier corresponding to the at least one client device from the at least one indication;
   identify a client device from the at least one device identifier, the client device being associated with a user account;
   associate the user account with the voice assistant device in response to identifying the client device;
   receive a request for data from a service associated with the user from the voice assistant device; and
   cause at least a portion of the data to be played back through the voice assistant device.

2. The system of claim 1, wherein the service comprises a third party service for which authentication is federated to an identity provider service and the user authentication service causes the at least one computing device to at least:
   obtain an authentication token for the service from the identity provider service, the authentication token being associated with the user;
   obtain the requested data from the service on behalf of the user in response to the request for data, wherein the requested data is obtained using the authentication token.

3. The system of claim 1, wherein the user authentication service, when executed by the at least one computing device, identify the client device from the at least one device identifier by:
   identifying at least one user account associated with the at least one client device; and
   determining that a respective calendar associated with the user account identifies a meeting location in proximity to the voice assistant device at a current time.

4. The system of claim 3, wherein a plurality of calendars are associated with a meeting location in proximity to the voice assistant device, and the instructions identify the client device by determining that the user account is identified as a meeting organizer of a calendar item associated with the meeting location.

5. The system of claim 1, wherein the indication that at least one client device is in proximity to the voice assistant device comprises an identifier of a location beacon obtained by the at least one client device.

6. The system of claim 1, wherein the instructions, when executed by the at least one processor, cause the computing device to at least:
receive an indication that the client device is no longer in proximity to the voice assistant device; and
remove the association between the user account and the voice assistant device such that a subsequent request for data associated with the user account from the voice assistant device fails.

7. A non-transitory computer-readable medium comprising machine-readable instructions, wherein the instructions, when executed by at least one processor, cause a computing device to at least:
receive an indication that at least one client device is in proximity to a voice assistant device, the indication generated at least in part by capturing an identifier from a Bluetooth location beacon in proximity to the voice assistant device;
extract at least one device identifier corresponding to the at least one client device from the at least one indication;
identify a client device from the at least one device identifier, the client device being associated with a user account;
associate the user account with the voice assistant device in response to identifying the client device;
receive a request for data from a service associated with the user from the voice assistant device; and
cause at least a portion of the data to be played back through the voice assistant device.

8. The non-transitory computer-readable medium of claim 7, wherein the instructions, when executed by the at least one processor, cause the computing device to at least:
obtain an authentication token for the service from the identity provider service, the authentication token being associated with the user; and
obtain the requested data from the service on behalf of the user in response to the request for data, wherein the requested data is obtained using the authentication token.

9. The non-transitory computer-readable medium of claim 7, wherein the instructions, when executed by the at least one processor, identify the client device from the at least one device identifier by:
identifying at least one user account associated with the at least one client device; and
determining that a respective calendar associated with the user account identifies a meeting location in proximity to the voice assistant device at a current time.

10. The non-transitory computer-readable medium of claim 9, wherein a plurality of calendars are associated with a meeting location in proximity to the voice assistant device, and the instructions identify the client device by determining that the user account is identified as a meeting organizer of a calendar item associated with the meeting location.

11. The non-transitory computer-readable medium of claim 7, wherein the indication that at least one client device is in proximity to the voice assistant device is obtained from a location beacon in proximity to the voice assistant device.

12. The non-transitory computer-readable medium of claim 7, wherein the instructions, when executed by the at least one processor, cause the computing device to at least:
receive an indication that the client device is no longer in proximity to the voice assistant device; and
remove the association between the user account and the voice assistant device such that a subsequent request for data associated with the user account from the voice assistant device fails.

13. A method comprising:
receiving an indication that at least one client device is in proximity to a voice assistant device, the indication generated at least in part by capturing an identifier from a Bluetooth location beacon in proximity to the voice assistant device;
extracting at least one device identifier corresponding to the at least one client device from the at least one indication;
identifying a client device from the at least one device identifier, the client device being associated with a user account;
associating the user account with the voice assistant device in response to identifying the client device;
receiving a request for data from a service associated with the user from the voice assistant device; and
cause at least a portion of the data to be played back through the voice assistant device.

14. The method of claim 13, further comprising:
obtaining an authentication token for the service from the identity provider service, the authentication token being associated with the user; and
obtaining the requested data from the service on behalf of the user in response to the request for data, wherein the requested data is obtained using the authentication token.

15. The method of claim 13, wherein identifying the client device from the at least one device identifier further comprises:
identifying at least one user account associated with the at least one client device; and
determining that a respective calendar associated with the user account identifies a meeting location in proximity to the voice assistant device at a current time.

16. The method of claim 15, wherein a plurality of calendars are associated with a meeting location in proximity to the voice assistant device, and identifying the client device further comprises determining that the user account is identified as a meeting organizer of a calendar item associated with the meeting location.

17. The method of claim 13, wherein the indication that at least one client device is in proximity to the voice assistant device comprises an identifier of a location beacon obtained by the at least one client device.

* * * * *